US 8,952,888 B2
Feb. 10, 2015

(12) United States Patent
Van Den Eerenbeemd et al.

(54) METHOD AND SYSTEM FOR CONVEYING AN EMOTION

(75) Inventors: Jacobus Maria Antonius Van Den Eerenbeemd, Eindhoven (NL); Floris Maria Hermansz Crompvoets, Eindhoven (NL); Paul Marcel Carl Lemmens, Eindhoven (NL); Dirk Brokken, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 213 days.

(21) Appl. No.: 12/991,154

(22) PCT Filed: May 4, 2009

(86) PCT No.: PCT/IB2009/051810
§ 371 (c)(1),
(2), (4) Date: Nov. 5, 2010

(87) PCT Pub. No.: WO2009/136345
PCT Pub. Date: Nov. 12, 2009

(65) Prior Publication Data
US 2011/0063208 A1    Mar. 17, 2011

(30) Foreign Application Priority Data
May 9, 2008  (EP) .................................... 08156012

(51) Int. Cl.
*G09G 5/00* (2006.01)
*G06F 3/01* (2006.01)

(52) U.S. Cl.
CPC ................ *G06F 3/011* (2013.01); *G06F 3/016* (2013.01)
USPC ........................................................ 345/156

(58) Field of Classification Search
CPC .......................................................... G06F 3/016
USPC ............................................................ 345/156
See application file for complete search history.

(56) References Cited

U.S. PATENT DOCUMENTS

| 5,565,840 A | 10/1996 | Thorner et al. |
| 5,682,901 A | 11/1997 | Kamen |

(Continued)

FOREIGN PATENT DOCUMENTS

| EP | 782843 A2 * | 7/1997 | .............. A61H 1/00 |
| EP | 1509042 A1 | 2/2005 | |

(Continued)

OTHER PUBLICATIONS

Guzik et al: "Correlations Between the Poincare Plot and Conventional Heart Rate Variability Parameters Assessed During Paced Breathing"; J. Physiol. Sci., Feb. 2007, vol. 57, No. 1, pp. 63-71.

(Continued)

*Primary Examiner* — Quan-Zhen Wang
*Assistant Examiner* — Chad Dicke

(57) ABSTRACT

The present invention relates to a method for conveying an emotion to a person being exposed to multimedia information, such as a media clip, by way of tactile stimulation using a plurality of actuators arranged in a close vicinity of the person's body, the method comprising the step of providing tactile stimulation information for controlling the plurality of actuators, wherein the plurality of actuators are adapted to stimulate multiple body sites in a body region, the tactile stimulation information comprises a sequence of tactile stimulation patterns, wherein each tactile stimulation pattern controls the plurality of actuators in time and space to enable the tactile stimulation of the body region, and the tactile stimulation information is synchronized with the media clip. An advantage with the present invention is thus that emotions can be induced, or strengthened, at the right time (e.g. synchronized with a specific situation in the media clip).

10 Claims, 3 Drawing Sheets

(56) References Cited

U.S. PATENT DOCUMENTS

| | | | |
|---|---|---|---|
| 6,358,201 | B1 | 3/2002 | Childre et al. |
| 6,983,124 | B1 | 1/2006 | Bayley et al. |
| 2001/0002126 | A1* | 5/2001 | Rosenberg et al. ........... 345/156 |
| 2004/0002305 | A1 | 1/2004 | Byman-Kivivuori et al. |
| 2004/0207542 | A1 | 10/2004 | Chang et al. |
| 2005/0070241 | A1 | 3/2005 | Northcutt et al. |
| 2005/0132290 | A1 | 6/2005 | Buchner et al. |
| 2005/0171447 | A1 | 8/2005 | Esperer |
| 2005/0181827 | A1 | 8/2005 | Nieminen-Sundell et al. |
| 2006/0221935 | A1 | 10/2006 | Wong et al. |
| 2007/0063849 | A1 | 3/2007 | Rosella et al. |
| 2007/0126927 | A1 | 6/2007 | Yun et al. |
| 2007/0150916 | A1 | 6/2007 | Begole et al. |
| 2007/0277092 | A1 | 11/2007 | Basson et al. |
| 2008/0059138 | A1* | 3/2008 | Tremblay et al. .............. 703/11 |
| 2008/0318673 | A1* | 12/2008 | Rofougaran .................... 463/29 |

FOREIGN PATENT DOCUMENTS

| | | |
|---|---|---|
| EP | 1753211 A2 | 2/2007 |
| WO | 9720305 A1 | 6/1997 |
| WO | 2007105132 A1 | 9/2007 |
| WO | 2007117649 A1 | 10/2007 |
| WO | 2007123923 A1 | 11/2007 |
| WO | 2009112990 A1 | 9/2009 |
| WO | 2009136306 A1 | 11/2009 |
| WO | 2009136340 A1 | 11/2009 |

OTHER PUBLICATIONS

Marciano et al: "Quantification of Poincare Maps for the Evalutation of Heart Rate Variability"; Computers in Cardiology, Sep. 1994, pp. 577-580.

Brennan et al: "Do Existing Measures of Poincare Plot Geometry Reflect Nonlinear Features of Heart Rate Variability"; IEEE Transactions on Biomedical Engineering, Nov. 2001, vol. 48, No. 11, pp. 1342-1347.

Wang et al: "Visualization of Short-Term HRV As an Index for Mental Stress Evaluation"; ICMIT 2007: Mechatronics, MEMS, and Smart Materials, Proceedings of the SPIE, Dec. 2007, vol. 6794, pp. 67943R-1-67943R-6.

Thong, T.: "Geometric Measures of Poincare Plots for the Detection of Small Sympathovagal Shifts"; Proceedings of the 29th Annual International Conference of the IEEE Engineering in Medicine and Biology Society (EMBS), Lyon France, Aug. 2007, pp. 4641-4644.

Tulppo et al: "Quantitative Beat-To-Beat Analysis of Heart Rate Dynamics During Exercise"; American Journal of Physiological Society, Jan. 1996, vol. 271, No. 1, Part 2, pp. H244-H252.

Brennan et al: "Poincare Plot Interpretation Using a Physiological Model of HRV Based on a Network of Oscillators"; American Journal of Physiology-Heart and Circulatory Physiology, 2002, vol. 283, pp. H1973-1-11886.

Yang, A.: "Poincare Plots: A Mini-Review"; HRV 2006, 16 Page Document.

Geldard, F.: "Some Neglected Possibilities of Communication"; Science, May 1960, vol. 131, No. 3413, pp. 1583-1588.

Geldard, F.: "The Cutaneous "Rabbit": A Perceptual Illusion"; Science, Oct. 1972, vol. 178, No. 4057, pp. 178-179.

Neyem et al: "Designing Emotional Awareness Devices: What One Sees Is What One Feels"; Ingeniare.Revista Chilena De Ingenieria, 2007, vol. 15, No. 3, pp. 227-235.

Patel: "Habitat: Awareness of Daily Routines and Rhythms Over a Distance Using Networked Furniture"; Proceedings of 2003 London Communications Symposium (LCS), Sep. 2003, 4 Page Document.

International Search Report—PCT/IB2009/051810.

* cited by examiner

METHOD AND SYSTEM FOR CONVEYING AN EMOTION

TECHNICAL FIELD

The present invention relates to a method for conveying an emotion to a person being exposed to a media clip.

BACKGROUND OF THE INVENTION

Haptic technology provides an interface to a user via the sense of touch by applying forces, vibrations and/or motions to the user. A typical example of a conventional haptic device is as a game controller. The game controller could, for example, be used to simulate a race car steering wheel by providing a "feel" of the road. As the user makes a turn or accelerates, the steering wheel responds by resisting turns or slipping out of control.

Another possible implementation is in relation to Internet communication, such as for example in relation to communication applications such as ICQ, MSN and the like. Such a system implementation is disclosed in US 2005/0132290, describing a skin stimulation system integrated into a wearable accessory. The system comprises a variety of sensing means for input information. Actuators placed on or close to the body of a person wearing the wearable accessory are used for generating visual auditive, tactile, gustatoric and/or olfactoric stimuli (e.g. heat, pressure vibrational and/or electric pulses, etc.). Through the arrangement simple emotions, such as an emoticon, can be expressed. For example, a smiley, ":-)", is translated into a short impulse or sequence of impulses at different force actuators, whereas a typical emotional expression such as "I like you" is e.g. represented as "a longer, low-frequency force pressure with maximum heat and a tender pressure". However, a problem with the above prior art system is that it is too blunt to be applicable for evoking and/or conveying more generic stimulation to a person, for example in relation to generic multimedia information, such as a video clip.

Thus, in view of the above, an object of the invention is to provide a more generic solution for conveying a stimulation to a person, and in particular for enhancing the experience for a person being exposed to a media clip, i.e. watching or listening to a media clip.

SUMMARY OF THE INVENTION

According to an aspect of the invention, the above object is met by a method for conveying an emotion to a person being exposed to multimedia information, such as a media clip, by way of tactile stimulation using a plurality of actuators arranged in a close vicinity of the person's body, the method comprising the step of providing tactile stimulation information for controlling the plurality of actuators, wherein the plurality of actuators are adapted to stimulate multiple body sites in a body region, the tactile stimulation information comprises a sequence of tactile stimulation patterns, wherein each tactile stimulation pattern controls the plurality of actuators in time and space to enable the tactile stimulation of the body region, and the tactile stimulation information is synchronized with the media clip.

Accordingly, an advantage with the present invention is thus that emotions can be induced, or strengthened, at the right time (e.g. synchronized with a specific situation in the media clip) to reinforce a specific happening in the media clip, thereby enhancing the multimedia experience. Multimedia here refers to combinations of content forms such as text, audio, still images, animation, video and interactivity content forms. It could also refer to a single content form such as a radio broadcast containing only audio data. Furthermore, the term media clip here refers to all kind of audio recordings and/or video recordings such as, for example, a radio broadcast, a TV broadcast, a movie on DVD, or an internet movie clip.

The present invention is based on the realization that emotions are powerful sensations that play a vital role in a multimedia experience, and that there typically is a physiological response associated with an emotion, and that this physiological response may be simulated in an advantageous manner by appropriate tactile stimulation of multiple body sites in a body region to induce the emotion to a person. It should be noted that the tactile stimulation according to the invention differs from conventional haptic technology known in the art since the tactile stimulation proposed by the invention simulates a bodily response belonging to an emotion (such as butterflies in the stomach belonging to being in love), whereas conventional haptic devices typically simulate the environment (such as a bumpy road).

Furthermore, the tactile stimulation according to the invention typically has an intrinsic emotional value. Thus, whereas the emotional expressions in prior art arrangements typically are predefined between users (e.g. a short pulse means "happy", or a long pulse means "I like you"), the tactile stimulation according to the invention is instinctively associated with an emotion.

A body site here refers to a single point of stimulus, such as the area of the body stimulated by a single actuator, or an area stimulated by a 'virtual actuator' (i.e. a perceptual illusion that may result when two or more actuators that are closely arranged are properly timed), and a body region here refers to an area of the body comprising a plurality of body sites which can be stimulated to induce an emotion. A body region may typically be a portion of the body such as, for example, an arm, shoulder, back, chest, neck, spine, heart-area, lung-area or belly. This may be advantageous as the bodily response belonging to many emotions are associated with a certain portion of the body, such as sending shivers down a person's spine, or when a person feels butterflies in the stomach. However, a body region may also be a more precise area, such as, the backside of the upper part of the arm, or a more extensive area such as the right arm and the right shoulder, or the entire torso. Furthermore, an actuator should in the context of the application be interpreted broadly, i.e. to a general device for tactile stimulation of a body site. An example of an actuator is a simple vibration motors, similar to those used in mobile phones. Additionally, tactile stimulation is not limited to vibration, but further includes other type of stimulation such as mechanical stimulation, e.g. pressure forces or displacements (perpendicular to the skin) or shear forces or displacements (in the plane of the skin), heat, electrostimulation or TENS (Transcutaneous Electro Nerve Stimulation). Also combinations of pressure, shear and movement like a stroking movement or touch are included.

The tactile stimulation information may further comprise a set of signal shapes, wherein each signal shape provides a drive signal for an actuator. An advantage is that these typically relatively short lived signals may convey some emotional content themselves. For instance, a smoothly (sinusoidal) and slowly varying signal is often perceived as more sad while an abruptly changing signal (e.g. a square wave) gives a more aggressive impression.

At least one of the tactile stimulation patterns may be configured for a first and a second of said plurality of actuators to be timed in a way that a "virtual actuator" occurs in between these actuators. The first and second actuators that are used to generate a "virtual actuator" are typically adjacent actuators. An advantage with using "virtual actuators" is that a better coverage of the body can be achieved with a limited number of real actuators.

In a preferred embodiment of the invention, the emotional state of the person may be registered using a sensor arrangement arranged together with, or separately from, the actuators. The appropriate tactile stimulation pattern can then be played in response to a persons emotional state, i.e. for further enhancing an emotion being felt by the person. An example of this is a person feeling a shivering, the sensors registering the shiver and as a response providing tactile stimulation information that relates to the registered emotion. The sensors typically measure psychophysiological data. Examples of sensors are Galvanic Skin Response (GSR), Electro Cardio-Gram (ECG), Photoplethysmograph (Blood Volume Pulse), Respiratory, Position, Acceleration (e.g. of certain body regions) and Facial Expression sensors.

According to another aspect of the invention there is provided a metadata file comprising multimedia information including at least one of audio information and video information, and tactile stimulation information, wherein the multimedia information and the tactile stimulation information are synchronized in time, and the tactile stimulation information comprises a set of shapes, each signal shape defining a drive signal for an actuator, and a tactile stimulation pattern, configured to control which actuators (in relation to the position of the actuators) are active at a specific time, and for each active actuator specify which signal shape to apply, and a pattern sequence controlling which tactile stimulation patterns that should be applied at a specific time. The shapes can be standardized and/or user defined.

An advantage is that the definitions of the shapes, their timings and their actuation positions on the body are incorporated in the metadata file. It is therefore not necessary to hardcode the shapes in the actuator (or in its associated circuitry). Instead the actuators are just a rendering device for the shapes. This greatly enhances the versatility of the system.

Each shape may have an amplitude over time configured to strengthen an emotion. An advantage is that the individual actuators may be steered with a time varying amplitude to further strengthen an emotion. For instance, a smoothly (sinusoidal) and slowly varying signal is often perceived as more sad while an abruptly changing signal (e.g. a square wave) gives a more aggressive impression. Additionally, the plurality of actuators may together with a control unit form a tactile system for conveying an emotion to a person being exposed to a media clip, wherein the control unit is adapted for processing the metadata file as described above. The system may further comprise a plurality of sensors to register an emotion in a manner as disclosed above.

According to an embodiment of the invention the plurality of actuators are provided in a textile garment, such as, for example, a textile jacket, or vest. An advantage is that a textile garment can be designed to fit tightly, thereby holding the actuators close to the body of the person for an optimal transfer of the tactile stimuli to the skin of the person wearing the garment. It also allows the positioning of the actuators to be tailored to a person's size. Furthermore, the actuators may be arranged in, a bracelet, jewelry piece, watch, glove or other wearable. The actuators may also be arranged in a blanket, a pillow and/or a sofa This enables the actuators to be provided close to the body of a person without requiring that the person wears a specific garment, and may be convenient for example in public environments.

Other objectives, features and advantages will appear from the following detailed disclosure, from the attached dependent claims as well as from the drawings.

BRIEF DESCRIPTION OF THE DRAWINGS

These and other aspects of the present invention will now be described in more detail, with reference to the appended drawings showing currently preferred embodiments of the invention, in which.

DETAILED DESCRIPTION OF PREFERRED EMBODIMENTS

Figure 1:
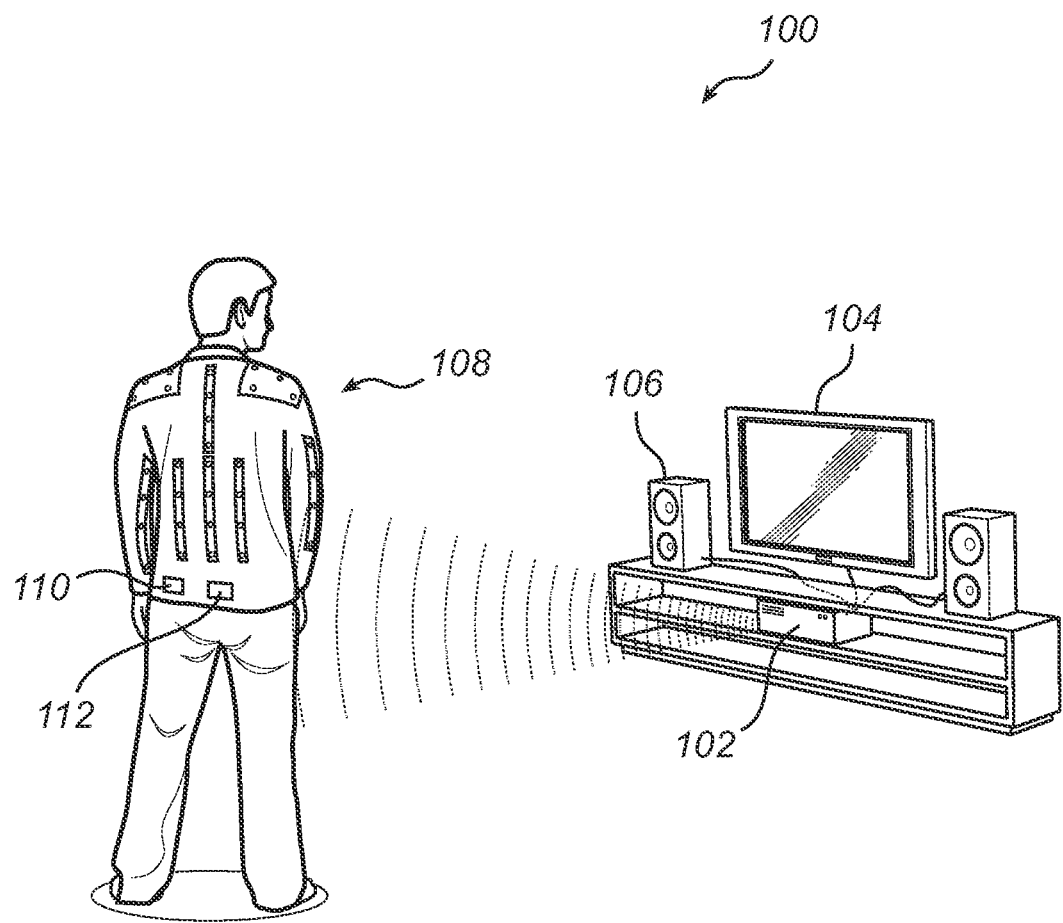
FIG. 1 illustrates a tactile stimulation system according to a preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a tactile stimulation system 100 according to a currently preferred embodiment of the invention. The system 100 comprises a metadata player 102 which is connected to a video rendering device 104, an audio rendering device 106, and a tactile rendering device 108.

The metadata player 102 is an electronic device capable of extracting tactile stimulation information from a metadata file (which is described more fully below in relation to FIG. 2) and controlling the tactile rendering device 108 based on this information. Here, the metadata player 102 also has functionality for controlling the video 104 and audio 106 rendering devices based on a media clip contained in the metadata file. However, in an alternative embodiment the metadata player 102 may be a complementary device to a multimedia device, such as for example an conventional DVD, which handles the audio and video rendering devices. The video rendering device 104 and the audio rendering device 106 may be a conventional display device 104 and speakers 106, respectively.

In the illustrated embodiment, the tactile rendering device 108 is a textile jacket 108 with a plurality of tactile actuators arranged therein. The jacket 108 is preferably designed to fit tightly to a user's body, as this enables an optimal transfer of the tactile stimuli to the skin of the user. The actuators are here simple vibration motors, similar to those used in mobile phones, sewn (e.g. embedded) into the textile jacket 108. However, a variety of actuators may be used such as various actuators for generating mechanical stimulation, such as pressure forces or displacements (perpendicular to the skin) or shear forces or displacements (in the plane of the skin). Other examples of possible actuators are, heaters (e.g. resistive elements), coolers (e.g. peltier elements), or devices for electrostimulation or TENS (Transcutaneous Electro Nerve Stimulation).

The actuators are steered by electronics that are addressed over a bus structure (not shown). The bus is typically embedded in the jacket 108. Furthermore, the textile jacket 108 is provided with a transceiver 110 for allowing communication with the metadata player 102. Although wired communication may be utilized, wireless communication is often preferred for user convenience. The textile jacket 108 is also provided with means for supplying power 112, such as a battery, and/or a connector for connection to an external power source such a wall socket.

Figure 2:
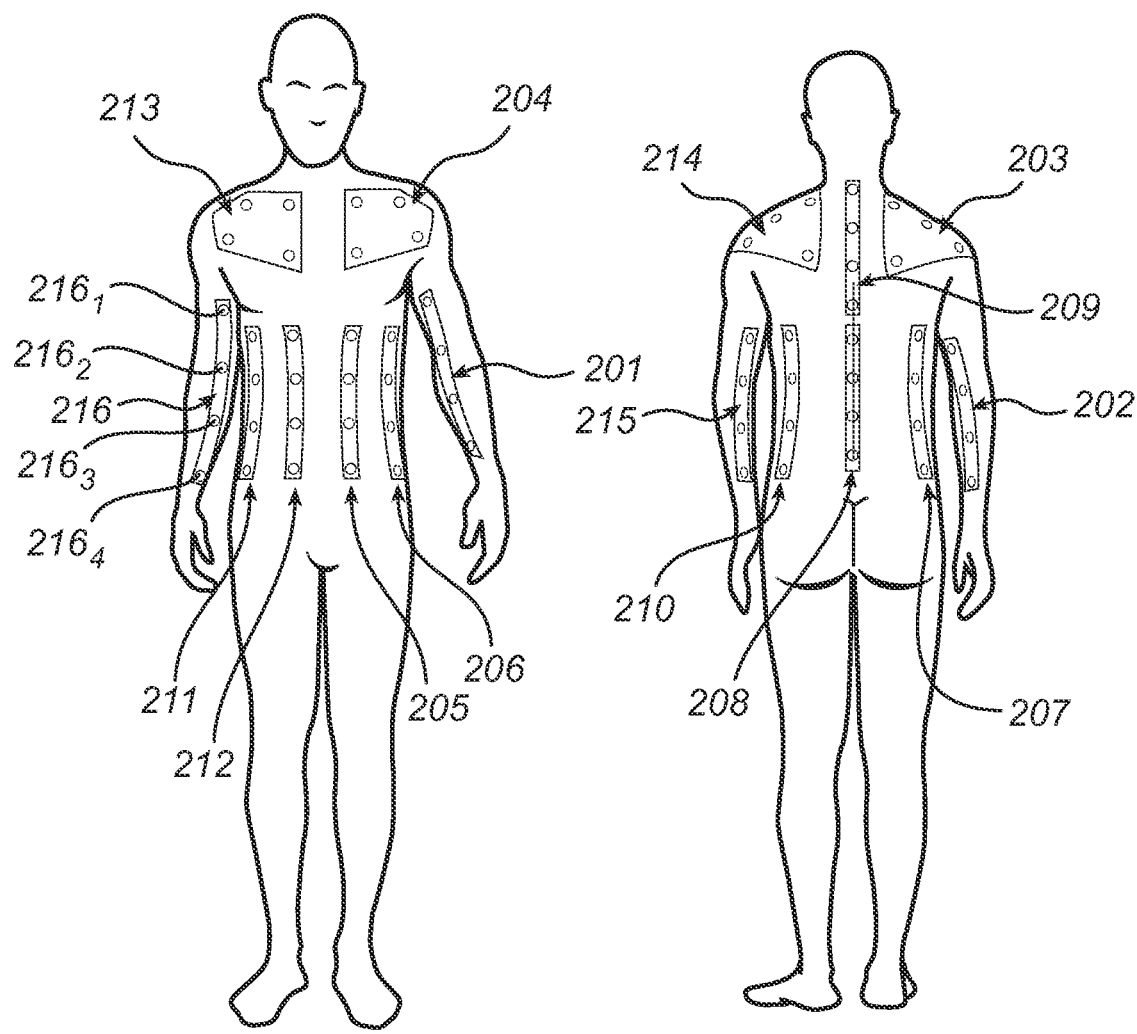
FIG. 2 illustrates a detailed view of the positioning of the plurality of actuators on a person's body.

FIG. 2 illustrates a possible layout of 64 actuators $201_{1-4}$-$216_{1-4}$, arranged on the upper part of the body of a person wearing the textile jacket 108. For sake of clarity of the drawing only four of the actuators (i.e. $216_{1-4}$) has been provided with reference numerals.

The actuators are here grouped in four, wherein each group of actuators 201-216 is provided with a driver (not shown) for steering the actuators. A main connection (not shown), with heavier wiring adapted for larger currents, connects the drivers, whereas smaller, lighter, more flexible wires (not shown) connect the actuators to its respective driver. Utilizing a single driver for a group of actuators allows a large number of actuators to be distributed across the upper body whereas the textile jacket 108 remains flexible and comfortable for the wearer. It also provides additional reliability and current carrying capabilities compared to a situation where all motors would be directly wired to a central driver. The number of actuators per driver may vary, but a suitable number of actuators per driver (in the case of vibration motors) is one to sixteen. To optimize the area of the body which can be stimulated by the actuators, the distance between the actuators is here approximately equidistant.

The actuators can be timed in such a way that a perceptual illusion occurs. (This is further discussed in Geldard et al, The cutaneous "Rabbit": a perceptual illusion, Science Vol. 178, p. 178; or Geldard et al, Some Neglected Possibilities of Communication, Science Vol. 131, p. 1583.) The illusion results in the feeling of stimulation in between actuators. For instance, with suitable timing of the firing of actuators $216_1$ and $216_2$ in area 216 (right frontal arm), "virtual touches" on the skin in between these actuators can be achieved. Note that this effect depends on timing only and is, thus, independent of the type of wave form (i.e. the shape) the actuator is steered with. By this "virtual actuators" a better coverage of the body can be achieved with a limited number of actuators. The area of the body stimulated by an individual actuator (e.g. actuator $216_1$), or by a "virtual actuator", constitutes a body site.

An area of the body stimulated by a plurality of actuators (real and/or virtual) to induce an emotion is referred to as a body region. As an example, actuator group 216 in FIG. 2 may constitute a body region, i.e. the right frontal arm, stimulated by actuators $216_1$-$216_4$. Other examples of body regions are the spine (actuator groups 208 and 209), the back (actuator groups 207, 208 and 210), and the belly (actuators group 205, 206, 211, and 212). A body region may also be a more precise area such as the upper part of the right frontal arm (actuators $216_1$ and $216_2$).

As many emotions are associated with a physiological response belonging to that specific emotion (e.g. the feeling of fear may be associated with a physiological response of shivers down the spine) it is often advantageous to focus the actuators around portions of the body that are particularly associated with the specific emotions that the tactile system is designed to convey to the user. Thus, although the actuator layout illustrated in FIG. 2 seek to cover as much of the upper body as possible, the actuators are primarily focused around the belly, the back, the spine, the shoulder, the chest and the arms. Examples of other portions of the body that may be of particular interest for arranging actuators are: heart-area, lung-area, and neck.

Figure 3A:
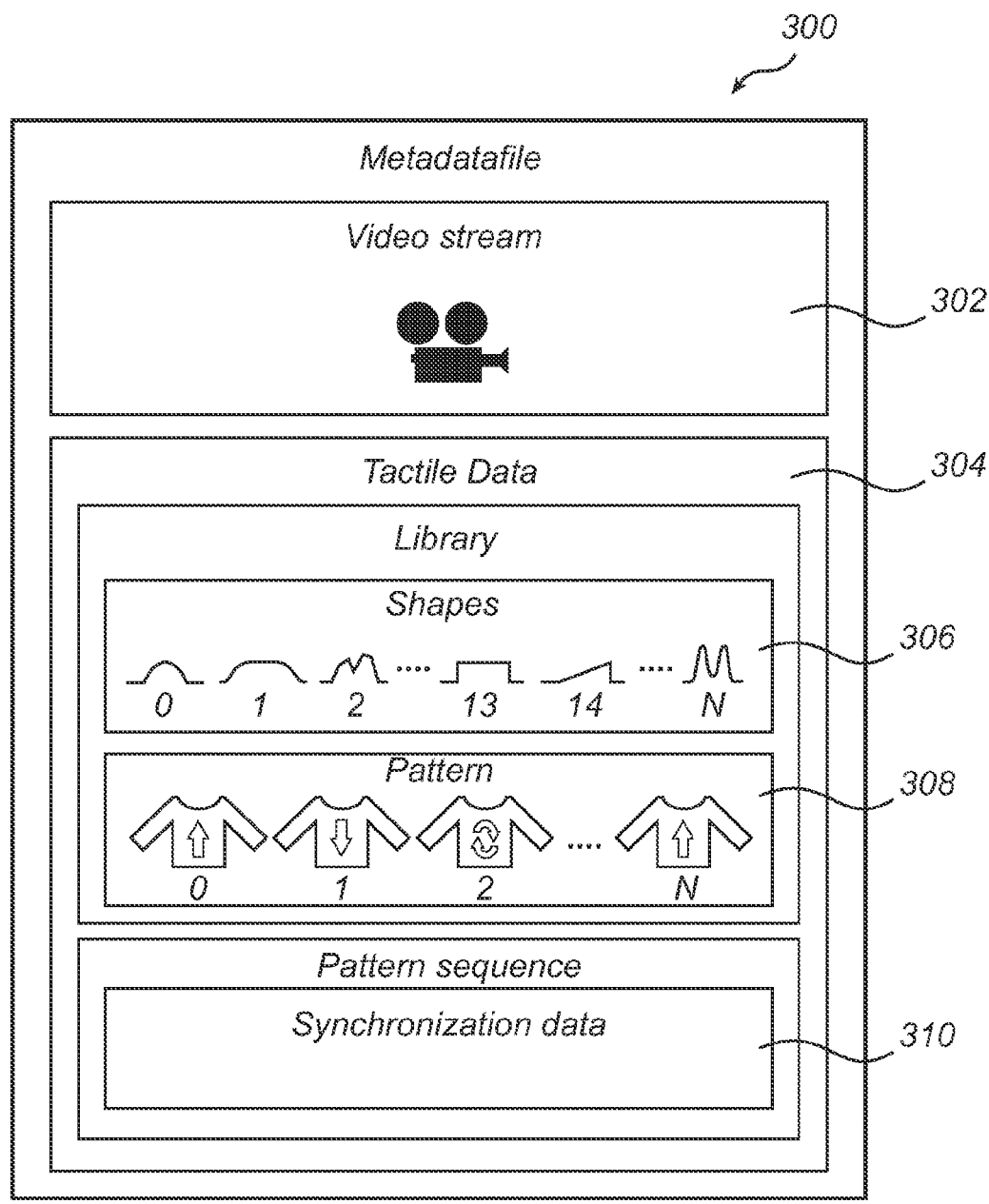
FIG. 3a provides a conceptual view of a metadata file according to the invention.

As mentioned above, the metadata player 102 can control the actuators based on information contained in a metadata file 300. A typical structure of the metadata file 300 is illustrated in FIG. 3a.

The metadata file 300 comprises information from a media clip 302, here in the form of a video stream 302 containing video and/or audio information, and a tactile data block 304 with information about the tactile stimulation. The video stream 302 may be provided as embedded video data or as a data link to a video stream. Feasible coding standards therefore are well-known in the art. Here, the tactile data block 304 comprises a library of shapes 306 and tactile stimulation patterns 308.

Each shape 306 in the library defines a signal for steering an individual actuator. The shape is typically a relatively short lived signal (typically on the order of a second) and may be a constant signal or a time varying signal (periodic or not). Examples of shapes are a sinusoidal wave or a square wave. Other examples of shapes are illustrated in FIG. 3a. However, essentially any suitable arbitrary signal shape is possible and within the scope of the invention. The shapes 306 are preferable referred to by labels, such as a number.

Each pattern 308 in the library is preferably designed to control the actuators to simulate the bodily response belonging to a specific emotion (by means of tactile stimulation of the user's body). In order to do this, the pattern 308 holds a sequence of actuator settings thereby defining which actuators are activated at each point in time throughout the duration of the pattern. The pattern could be implemented as a data array containing the following information: a time followed by a series of elements where each element contains an actuator number, a shape number and an amplitude applied to this actuator. As the actuator number refers to a position on the body it is possible to achieve spatial varying tactile patterns. In this series of elements either all actuators are listed and an amplitude of zero is used to indicate that actuator is not driven or only the actuators that are driven are listed and other are left out. It will be clear to a person skilled in the art that, although a numbering label of actuators is preferred, different schemes can be used to address different actuators.

An illustrative example of a data array for a pattern is provided below on the format: time (second)→(actuator no, shape no, amplitude)

00.00→$(201_1,5,1.0)(201_2,1,0.4)$ ... $(212_1,0,0)(212_2,0,0)$ ... $(216_4,11,1.5)$ 07.90→$(201_1,0,0)(201_2,0,0)$ ... $(212_1,5,1.0)(212_2,1,0.4)$ ... $(216_4,0,0)$ 09.81→$(201_1,2,2.1)(201_2,0,0)$  .  .  .  $(212_1,16,2.3)$ $(212_2,0,0)$ ... $(216_4,0,0)$

...

33.33→$(201_1,3,1.2)(201_2,4,1.6)$ . . . $(212_1,3,1.0)(212_2,0,0)$ ... $(216_4,8,4)$

In this example the first actuator settings lasts for 7.9 seconds (i.e. from time 00.00 to time 07.90). During this time actuator $201_1$ is steered with shape 5 and an amplitude of 1.0; actuator $201_2$ is steered with shape 1 and an amplitude of 0.4 (of arbitrary unit); and so on. Note that as e.g. actuators $212_1$ has an amplitude set to zero it is not active. Then, after the 7.9 seconds have elapsed, there is a new actuator setting which lasts from 07.90 to 09.81, and so on. The patterns could be stored, using techniques for lossless movie compression and/or storage structures available in the art. It is recognized that a duration of a pattern varies, for example, depending on the emotion to be simulated. However, a typical pattern has a duration of a few seconds (typically 1-10 seconds). During the duration of the pattern shapes can be repeated.

The tactile data block 204 also contains a pattern sequence 210. The pattern sequence defines which pattern to play at which time, to synchronize the tactile stimulation with the content of the video stream. An example could be:

...

"play 'shiver down spine'=pattern no. 1 at 10:00:04 seconds into the movie"

...

"play 'create a heartbeat in the throat'=pattern no. 5 at 10:01:46 seconds into the movie"

...

"play 'butterflies in the stomach'=pattern no. 4 at 31:15:00 seconds into the movie"

...

Figure 3B:
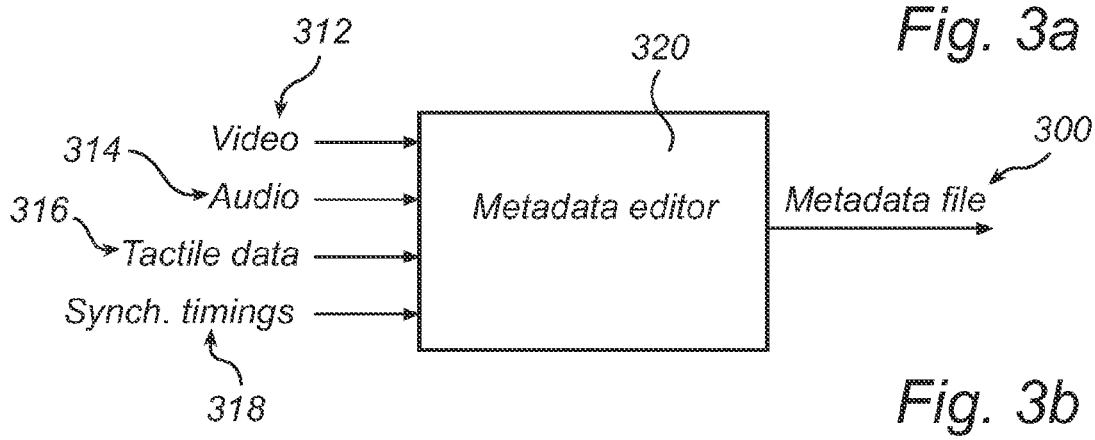
FIG. 3b provides a conceptual view of a metadata editor for generating a metadata file.

The metadata file 300 can be generated by a metadata editor 320 that combines video information 312, audio information 314, tactile stimulation information 316, and synchronization information 318 (i.e. for synchronizing tactile stimulation to the media clip) as schematically shown in FIG. 3*b*. The metadata editor 320, which for example may be a computer program run on a PC, allows the user to edit the information in the metadata file 300. Furthermore, the metadata file 300 is preferably generated as a new file, so the content of the original media clip remains unchanged.

A typical application of the tactile system will now be described with reference to FIGS. 1 to 3. A person wearing the textile jacket 108 watches a movie on a home entertainment system as illustrated in FIG. 1. The metadata player 102 processes the metadata file 300, and renders video and audio data contained in the video stream 302 to the TV-screen 2 and to the speakers 3, respectively. Moreover, the metadata player 102 processes the tactile data 304 and plays the tactile stimulation patterns 308 (and the associated shapes 306) as prescribed in the pattern sequence 310. For each pattern played, steering signals are transmitted from the metadata player 102, via the wireless communication link, to the transceiver 110 in the textile jacket 108. The steering signals are then distributed via the bus structure in the textile jacket 108 to activate the appropriate actuators, wherein the actuators stimulates the skin of the person wearing the textile jacket. Thus, as a pattern is played the bodily response associated with an emotion can be simulated. As the patterns are synchronized with the content of the media clip, properly timed emotions are conveyed to the person exposed to the media clip thereby enhancing the multimedia experience. For user convenience, the tactile actuators can typically be switched on and off by a mute button.

Examples of emotions that may be induced by means of tactile stimulation are:
  send shivers down a person's spine by sequentially driving the actuators that are placed along the spine to enhance feelings of fear.
  drive the actuators across the arms and shoulders to create the impression of an insect walking on your skin to increase feelings of fear in a different way.
  drive the actuators in such a way that a person feels butterflies in the stomach like one feels when falling in love.
  create a heartbeat in the throat when being afraid.
  implement a comforting stroke when the viewer feels sad.
  enhance happy feelings with patterns that rapidly vary over the actuators (tickling fingers').
  amplify anger with strong and brief outbursts on the actuators.
  imitate the feeling of a lump in ones throat with a longer steady stimulation at the throat that emphasizing the feeling of sadness.

In an alternative embodiment of the invention, the emotional state of the person may be registered using a sensor arrangement arranged together or separately from the actuators. Depending on the application the sensor arrangement may include sensors for measuring Galvanic Skin Response (GSR), Electro CardioGram (ECG) and/or Photoplethysmograph (Blood Volume Pulse). Other examples are Respiratory sensors, Acceleration sensors and Facial Expression sensors. The sensors enable psychophysiological data to be registered. The registered data can then be interpreted by means of feature extraction followed by classification (e.g. Support Vector Machines). The results are stored as classified emotions. The measured emotions can then be reinforced by using tactile stimulation patterns that belong to that specific emotion. An example of this is a person feeling a shivering, wherein the sensors register the shiver and as a response plays the tactile stimulation pattern that relates to the registered emotion.

According to another embodiment the actuators are implemented in the cushions attached to a couch, or a sofa, wherein the sofa is connected to the metadata player. In this embodiment, the actuators at the front of the body could be implemented in a separate throw pillow or a blanket that the viewer clasps for comfort and warmth. Another embodiment could have the form of a blanket instead of a jacket. Although, this may reduce the accuracy of stimulating the appropriate body region(s), it enhances the ease of use. Yet another embodiment could have the form of a smaller wearable such as a bracelet, a watch or a piece of jewelry. Although the body coverage typically would be limited, it may still convey an emotion to a wearer and enhance the multi media experience. Alternatively, specialized (preferable flexible) wearables could be constructed, such as a glove or armband with similar effects.

Other applications that can be conceived are for instance, therapeutic care for patients with Asperger syndrome or even an autistic spectrum disorder. Another alternative application would be to add additional programs to the metadata player that are specifically designed for massaging the upper body. This application could be combined with, for example, TV-programs that are intended to create a relaxation effect. Yet another application could be the extension of current instant-messaging applications to be able to better convey emotions than the current usage of so called emoticons can achieve.

The skilled person realizes that the present invention by no means is limited to the preferred embodiments described above. On the contrary, many modifications and variations are possible within the scope of the appended claims. For example, the here proposed data structure is pattern based, alternatively one could also devise a data structure that is stream based, i.e. every actuator setting is changed individually at predetermined time intervals. Additionally, although the body region here has been described as being part of the upper body, the invention may equally well be applied to the lower part of the body. Thus, instead of a textile jacket, trousers with embedded actuators may be used, to stimulate body regions, such as, for example a leg or part thereof. Also tactile stimulation of other body part such as e.g. head, feet, and hands would be possible. Furthermore, it is recognized that modifications can be made to the metadata file without departing from the general concept thereof. For example, the shape and/or amplitude for an actuator can be set by the pattern sequence instead of being set by the pattern.

The invention claimed is:

1. A method for conveying an emotion to a person being exposed to multimedia information, by way of tactile stimulation using a plurality of actuators arranged in a vicinity of the person's body, the method comprising
    a) exposing the person to multimedia information including video and/or audio information and tactile stimulation information;
    b) extracting the video and/or audio information from the multimedia information;
    c) extracting the tactile stimulation information from the multimedia information, wherein said extracted tactile stimulation information comprises a pre-stored sequence of tactile stimulation patterns comprising signal shapes which are pre-selected from a library of signal shapes,
    d) controlling the plurality of actuators in time and space according to the pre-stored sequence of tactile stimulation patterns, wherein the plurality of actuators are steered by electronics that are addressed over a bus structure, wherein the bus structure wirelessly communicates with a metadata player via a transceiver coupled to the bus structure;
    wherein the tactile stimulation patterns are time synchronized with the audio/visual information to enable a predefined vibrotactile stimulation of one ore more body regions of the person'body at predefined points in time to convey emotions to the person in respond to the audio/visual information;
    wherein the multimedia information comprises an original video stream and a corresponding metadata file generated by a metadata editor, the metadata file comprising information from the original video stream containing said video and/or audio information, said tactile stimulation information comprising a tactile data block with information about the tactile stimulation, and synchronization information for synchronizing the tactile stimulation information to the original video stream, and
    wherein the tactile data block comprises the library of signal shapes and tactile stimulation patterns, each signal shape in the library of signal shapes defining a waveform signal for steering an individual actuator, and each pattern comprising a sequence of actuator settings defining which activators are activated at each point in time throughout the duration of the pattern;
    wherein each pattern in the library is designed to control certain actuators to stimulate a bodily response associated with a specific emotion.

2. Method according to claim 1, wherein the body region is a portion of the body selected from the group of shoulder, back, chest, torso, neck, spine, heart-area, lung-area, belly, arms.

3. Method according to claim 1, wherein each signal shape in the pre-stored sequence of tactile stimulation patterns provides a drive signal for an actuator.

4. Method according to claim 1, wherein at least one of the tactile stimulation patterns is configured for a first and a second of said plurality of actuators to be timed in a way that a "virtual actuator" occurs in between these actuators.

5. Method according to claim 1 further comprising the steps of registering the emotional state of the person using a sensor arrangement.

6. The method according to claim 1, wherein each shape has an amplitude over time configured to induce an emotion.

7. The method according to claim 1, wherein each pattern in the set of tactile stimulation patterns comprises a temporally indexed data array indexed by time, wherein each row defines for a specific starting time, which actuators are activated for the specific start time, which of said signal shapes are to be used to activate the actuators at the specific start time and an amplitude level setting for the selected signal shape.

8. The method according to claim 7, wherein each row of the data array is structured in accordance with a plurality of data elements including: an actuator activation start time for at least one actuator, an actuator identifier for the at least one actuator, and a signal shape and a signal level to be applied to the at least one actuator.

9. A tactile stimulation system for conveying an emotion to a person being exposed to a media clip, the system comprising:
    a metadata editor configured to generate a metadata file from said media clip by combining video information and/or audio information from the media clip with tactile stimulation information and synchronization information;
    a plurality of actuators coupled to a tactile rendering device for controlling the actuators in time and space according to said tactile stimulation information comprising a pre-stored sequence of tactile stimulation patterns, wherein the plurality of actuators are steered by electronics that are addressed over a bus structure, and wherein the bus structure wirelessly communicates with a metadata player via a transceiver coupled to the bus structure;
    a metadata player coupled to a video rendering device, the metadata player configured to:
        extract tactile stimulation information from the generated metadata file, wherein the tactile stimulation information extracted from the generated metadata file comprises a tactile data block comprising at least a pre-selected subset of signal shapes and tactile stimulation patterns pre-selected from a library of signal shapes and tactile stimulation patterns each signal shape defining a signal for steering an individual actuator, and each pattern comprising a sequence of actuator settings defining which activators are activated at each point in time throughout the duration of the pattern, wherein each pattern in the library is designed to control certain actuators to stimulate a bodily response associated with a specific emotion;
    an audio rendering device coupled to the metadata player configured to extract audio information from the metadata file,
    a processor for processing the tactile stimulation information to control said plurality of actuators in time and space according to the pre-stored sequence of tactile stimulation patterns which comprise signal shapes that are pre-selected from a library of signal shapes,
    wherein the tactile stimulation patterns are time synchronized with the audio/visual information to enable a predefined vibrotactile stimulation of one or more body regions of the person's body at predefined points in time to convey emotions to the person in response to the audio/visual information.

10. A tactile stimulation system according to claim 9, wherein the plurality of actuators are provided in a textile garment.

* * * * *